UNITED STATES PATENT OFFICE.

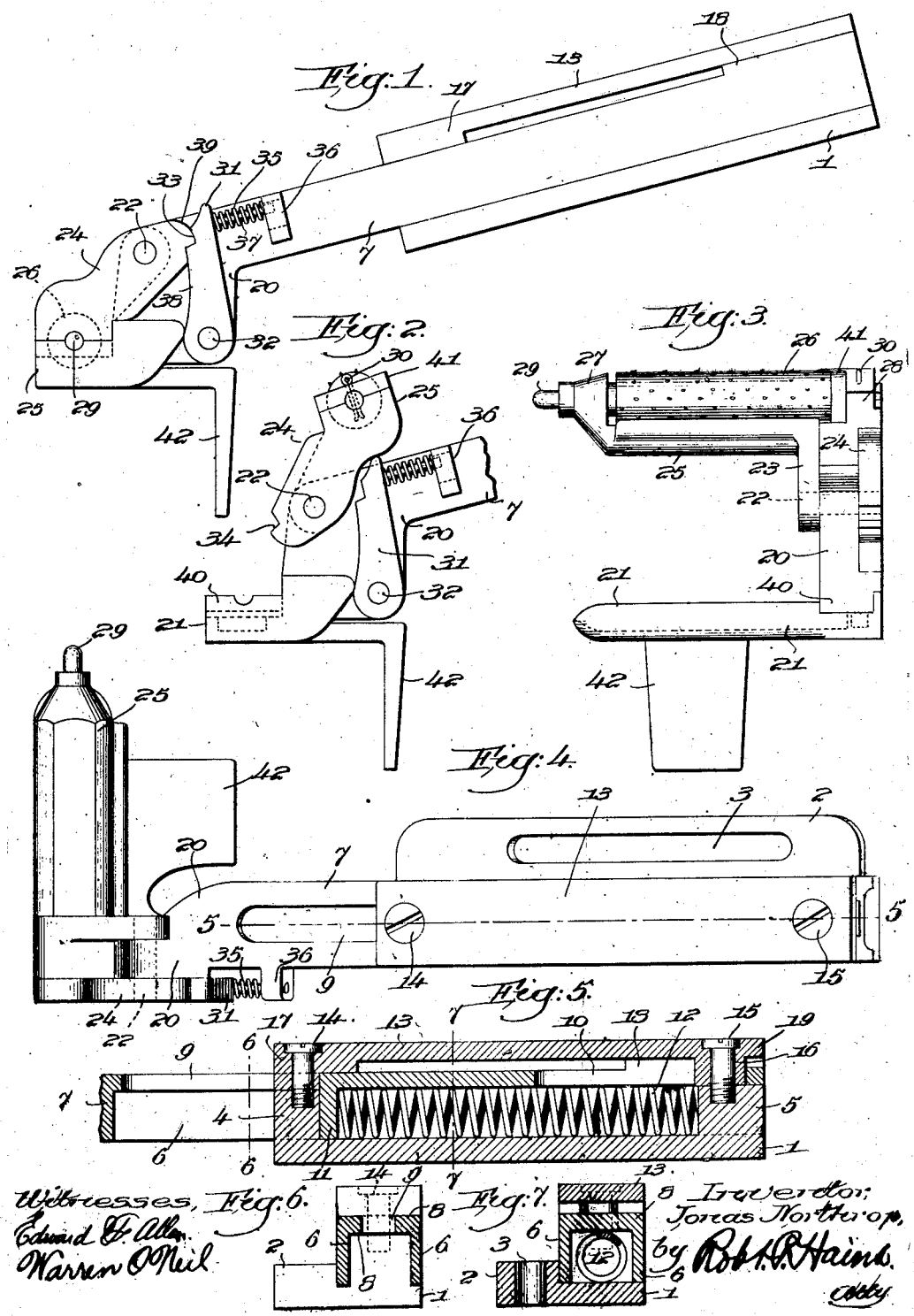

JONAS NORTHROP, OF HOPEDALE, MASSACHUSETTS, ASSIGNOR TO DRAPER COMPANY, OF HOPEDALE, MASSACHUSETTS, A CORPORATION OF MAINE.

LOOM-TEMPLE.

1,027,498.  Specification of Letters Patent.  Patented May 28, 1912.

Application filed September 15, 1911. Serial No. 649,566.

*To all whom it may concern:*

Be it known that I, JONAS NORTHROP, a citizen of the United States, residing at Hopedale, in the county of Worcester and State of Massachusetts, have invented an Improvement in Loom-Temples, of which the following description, in connection with the accompanying drawings, is a specification, like letters on the drawings representing like parts.

The invention to be hereinafter described relates to looms, and more particularly to the temples for engaging and holding the edge portions of the fabric as it is woven.
The aims and purposes of the present invention are to provide a loom temple which shall be simple in construction, efficient in operation, and wherein the parts shall be so contrived and combined that objectionable characteristics of temples, as heretofore constructed, may be eliminated, all of which will best be made clear from the following description and accompanying drawings of one form of means for carrying the invention into practical effect, it being understood that the essentials of the invention may exist in modified forms of constructions, and that in its true scope it is defined by the claims.

In the drawings:—Figure 1 is a side elevation of a temple embodying the present invention; Fig. 2 is a like view of the temple head with the cap turned up; Fig. 3 is a front elevation of the parts shown and positioned as in Fig. 2; Fig. 4 is a top or plan view of the temple; Fig. 5 is a section on the line 5—5, Fig. 4; Fig. 6 is a cross section on the line 6—6, Fig. 5; and Fig. 7 is a like section on line 7—7, Fig. 5.

As well understood by those skilled in the art, the temple is sustained by a suitable support adjacent the edge of the cloth. This support in the present invention may for identification be known as the temple holder and comprises a base 1 from which projects the flange 2 having a slot 3 for the reception of fastening means by which it may be conveniently secured adjustably to the breast beam or other desirable sustaining means.

Projecting upward from the base 1 are the lugs or projections 4, 5, Fig. 5, one at each end, which are embraced by the side flanges 6 of the temple rod 7, said side flanges being joined by the upper web 8, having the longitudinally extending slots 9 and 10 for a purpose which will presently appear. The temple rod 7 has a seat 11 against which bears one end of a spring 12, the other end whereof rests against the lug or projection 5, the construction being such that the spring 12 acts normally to maintain the temple rod with the seat or lug 11 against the lug or projection 4, but is adapted to yield to permit movement of the temple rod longitudinally to the left, Fig. 5, of the temple holder.

In order to maintain the temple rod and temple holder in the described assembled relation, the present invention contemplates a retainer 13, Figs. 1, 5 and 7, having lugs 16, 17, one at each end, through which extend the retainer screws 14, 15, or other fastening means, which engage the lugs 4 and 5, as by screw thread connection. The lugs 16 and 17 of the retainer pass through the longitudinal slots 10 and 9 respectively formed in the upper web of the temple bar, the construction being such that while the retainer 13 holds the flanged temple rod 7 in co-acting relation with the temple holder, the lugs 16 and 17 of the retainer serve as guides for the temple rod as it is moved longitudinally and may act as stops to limit such movement.

From the construction thus far described it will be noted that should the temple rod or holder become worn to such an extent as to manifest lost motion or objectionable looseness, it is only necessary to remove the screws 14, 15, take off the retainer 13 and pass a file or other reducing agent over the faces of the lugs 16 and 17, and reassemble the parts without removing the temple or the holder from the loom. This is due to the fact that the screws which hold the retainer in place, and consequently the temple rod, do not also connect the temple holder with its supporting means, but such connection of the temple holder with its supporting means is afforded by suitable fastening devices other than the screws 14 and 15, which pass through the slot 3 of the temple holder. The temple rod 7 has also a shoulder 18, which when the temple rod is moved to the right, Fig. 5, is adapted to engage the end 19 of the retainer 13 to hold the temple rod in retracted position against the stress of the spring 12.

From the construction shown and thus far described it will be noted that the temple rod 7 is of substantially ⋂-shape in cross section and that such general shape of the temple rod throughout its extent serves to give added strength to the temple rod and overcome liability to breakage now so common in temple rod constructions.

Owing to the fact that the temple roll may at times become clogged with lint it is desirable that the temple construction be so devised that the roll may be readily cleaned and that, in some cases, it may be readily detached and replaced. With these facts in mind the present invention contemplates a construction wherein the temple roll and the parts of the temple shall be so devised and related that the temple roll may be readily and easily cleaned without disturbing its operative relation with the other parts and also that it may, at times, be removed expeditiously and without disintegrating the temple construction. As one form of means to this end the present invention contemplates mounting the temple roll so that it may be turned up from the cloth and be rendered accessible for cleaning purposes and that the spindle on which it is mounted may be easily and readily removed as will now be explained.

The temple rod 7 is provided with a down-turned portion 20, Fig. 1, carrying the temple pod 21, which may conveniently be made integral with the temple rod and preferably has a concaved portion to surround part of the temple roll as usual. Obviously, the temple pod might be made separate from the temple rod and be suitably secured thereto, though the integral construction has been found to be mechanically convenient.

Hinged to the down-turned portion 20 of the temple rod as at 22 are the arms 23 and 24 which embrace between them the part 20 of the temple rod. The arms 23 and 24 carry the temple cap 25 which partly surrounds the temple roll 26 and has end portions 27 and 28 in which the temple spindle 29 is removably secured. The temple roll 26 is mounted on the temple spindle 29 within the cap 25 and one end of the temple spindle 29 is held in its bearings by means of a cotter pin 30, Figs. 2 and 3, the construction being such that by simply withdrawing the cotter pin 30 the temple spindle 29 may be withdrawn endwise from the bearings 27 and 28 of the temple cap and the temple roll be thus disengaged and removed.

As hereinbefore explained, the temple cap is carried by the arms 23 and 24 which are hinged at 22 to the portion 20 of the temple rod, and in order to maintain the temple roll in its lower operating position with respect to the temple pod 21, means are provided for locking the parts in their operative position, as indicated in Fig. 1.

The character of means shown as a convenient form of this feature of the invention comprises a lock 31 pivoted at 32 to the down-turned portion 20 of the temple rod 7, said lock 31 having a locking recess 33 to engage a shouldered portion 34 formed in the arm 24. The locking arm 31 is normally under the influence of a spring 35 disposed between it and a lug 36 projecting from the temple rod, said spring being preferably disposed about a guiding stud 37, the construction being such that the locking arm 31 while normally held pressed into this locking position is nevertheless yieldable to permit its locking recess 33 to be disengaged from the locking shoulder 34 on the arm 24.

The edge portion 38 of the locking member 31 is preferably formed as a curve to be engaged by the curved end portion 39 of the arm 24, the construction being such that when the locking member 31 is withdrawn to permit the temple cap and temple roll to be raised from operative position, the curved portion 39 of the arm 24 will engage and ride along the curved edge portion 38 of the locking member 31 to maintain it pressed to the rear against the action of the spring 35.

When the temple cap and perforce the temple roll are drawn to operative position a complemental recess and projection, one on the temple cap and one on the temple pod, are engaged to correctly define operative position of the parts. These complemental portions are conveniently indicated in Figs. 2 and 3 at 40 and 41, but obviously other character of complemental portions may be employed to the above ends, if desired.

Projecting downward from the temple pod is the finger 42 which is adapted to be engaged by the lay, as the latter moves forward in beating up the filling, said finger being of usual or ordinary construction and operation.

From the construction described as a convenient embodiment of the present invention it will be noted that the temple cap is so connected and related to the temple pod and temple bar that said temple cap together with the temple roll may be drawn upward from the cloth in a plane extending longitudinally of the temple rod and that when so turned up the temple roll is in convenient position for cleaning, also that by disengagement of the cotter pin 30 when the parts are in the position last described, the temple roll supporting beams 29 may be readily withdrawn to permit removal of the temple roll without in any way disturbing the organized construction of the temple or its position and adjustment on the loom frame. It will also be apparent that the locking device for holding the temple roll in operative position is automatic in action, and as the parts are turned from the position indicated in Fig. 2 to that indicated in Fig. 1, said locking device will be drawn into action without further attention on the part of the operator.

It will be noted also that the cotter pin 30 for holding the temple spindle in place is preferably passed through one of the bearings of the temple cap into or through the temple spindle, and that when the temple cap is in lowered or operative position that the head of the cotter pin is housed in a recess in the temple pod, so that it offers no undesirable projection to catch lint or be disturbed accidentally, the pointed end of the cotter pin being also preferably housed within the cap bearing.

From the essentials of the described invention, it will be seen that the temple rod may be readily removed from the temple holder when desired without disturbing the adjustment of the latter on the sustaining means, such as the breast beam, so that when the parts are reassembled no readjustment of the temple is necessary.

What is claimed is:

1. In a loom temple, the combination of a temple rod, a temple pod, a temple cap carrying a temple roll, said temple cap being mounted to swing upward from the temple pod to expose the temple roll, and having a locking shouldered portion and a pivoted locking device having a portion complemental of the locking shoulder to engage therewith to hold the temple cap and roll in operative relation with the temple pod.

2. In a loom temple, the combination of a temple rod, a temple pod, a temple cap carrying a temple roll and pivotally mounted to swing in a vertical plane extending longitudinally of the temple rod, said cap having a part provided with a locking shoulder, a locking member pivotally mounted and having a locking recess to engage the said locking shoulder, and means for automatically engaging said locking parts when the cap is moved into operative relation with the pod.

3. In a loom temple, the combination of a temple rod, a temple pod, a temple cap movable from the temple pod and having bearings, one at each side portion of the cap, a temple spindle supported by said bearings and carrying a temple roll, said spindle being movable longitudinally to and from operative position, and means accessible only when the temple cap is moved from the temple pod to unlock the spindle from said bearings.

4. In a loom temple, the combination of a temple rod, a temple cap jointed with relation to said rod to swing upward, a bearing at each end of the temple cap, a temple spindle supported by said bearings and carrying a temple roll, and a unitary device accessible only when the cap is swung away from the pod for detachably locking the spindle in supporting relation with said bearings.

5. In a loom temple, the combination of a temple rod, a temple cap jointed with relation to said rod to swing upward, a bearing at each end of the temple cap, a temple spindle adapted to be engaged with said bearings by endwise movement of said spindle, a temple roll mounted on said spindle, and a pin engaging one of said cap bearings for holding the spindle in said bearings.

6. In a temple for looms, the combination of a temple rod, a temple pod, a temple cap carrying a temple roll and hinged with relation to the temple rod to swing to and from the temple pod in a plane parallel to the vertical plane passing longitudinally through the axis of the temple rod, a pivoted locking member for holding the cap and roll in operative position, and a spring for actuating the locking member, said swinging temple cap having a part for engaging and moving along the locking member to hold the latter from movement in response to said spring as the said cap is swung to and from operative position.

7. In a temple for looms, the combination of a temple rod, a temple pod, a temple cap carrying a temple roll and hinged with relation to the temple rod to swing to and from the temple pod in a plane parallel to the vertical plane passing longitudinally through the axis of the temple rod, said cap having an arm extending at that side of its hinge opposite the temple roll, a pivoted locking member having a part to engage and interlock with said extending arm, and means acting normally to hold it in locking position.

8. In a loom temple, the combination of a temple rod carrying a temple roll and having side flange portions, a temple holder having lugs projecting therefrom and embraced by the temple rod, a retainer comprising a plate overlying the temple rod, and having projecting portions resting on the lugs of the temple holder, and means for securing the retainer to the said lugs of the temple holder.

9. In a loom temple, the combination of a temple rod carrying a temple roll, and having side flanges, a temple holder having lugs embraced by said side flanges, a retainer having lugs adapted to be seated on the lugs of the temple holder, and detachable connections between the temple holder and retainer.

10. In a loom temple, the combination of a temple holder having a base portion and lugs projecting upward therefrom, a flange extending from the base portion for securing the base portion independently to the loom, a temple rod movable longitudinally of the holder and having side flanges to embrace the said lugs, a retainer for holding the temple rod and temple holder in coöperating relation, and provided with downwardly projecting lugs adapted to be seated face to face upon the base lugs, and means for securing the retainer to the base portion of the holder.

11. A loom temple comprising in combination, a temple holder having a bearing portion at separated points in its length, a temple rod carrying a temple roll and movable longitudinally of the temple holder, a retainer overlying the temple rod and having bearing lugs to rest upon the said bearing portions of the temple holder and means for securing the retainer to the temple holder with the bearing lugs engaging the separated bearing portions of the holder that the retainer may be readily removed and the height of said lugs adjusted to conform to the wear of the parts.

12. A loom temple comprising in combination, a temple holder provided with an upwardly projecting lug at each end having an upper bearing face, a temple rod carrying a temple roll and movable longitudinally of the temple holder, means for securing the temple holder to the loom frame, and independent means for securing the temple holder and temple rod in assembled relation, said means including a retainer having lugs provided with bearing faces to engage the bearing faces of the lugs on the holder, and devices for holding said lugs in engagement.

In testimony whereof, I have signed my name to this specification, in the presence of two subscribing witnesses.

JONAS NORTHROP.

Witnesses:
W<small>M</small>. O. P<small>ERKINS</small>,
E. D. O<small>SGOOD</small>.